United States Patent
Gutschi et al.

(10) Patent No.: US 11,577,712 B2
(45) Date of Patent: Feb. 14, 2023

(54) METHOD FOR INFLUENCING THE KINEMATIC BEHAVIOR OF A VEHICLE

(71) Applicant: SIEMENS AG ÖSTERREICH, Vienna (AT)

(72) Inventors: Daniela Gutschi, Graz (AT); Markus Knoll, Nuremberg (DE); Gerhild Schinagl, Stattegg (AT)

(73) Assignee: SIEMENS MOBILITY AUSTRIA GMBH, Vienna (AT)

(*) Notice: Subject to any disclaimer, the term of this patent is extended or adjusted under 35 U.S.C. 154(b) by 1000 days.

(21) Appl. No.: 16/335,554

(22) PCT Filed: Sep. 13, 2017

(86) PCT No.: PCT/EP2017/072996
§ 371 (c)(1),
(2) Date: Mar. 21, 2019

(87) PCT Pub. No.: WO2018/054736
PCT Pub. Date: Mar. 29, 2018

(65) Prior Publication Data
US 2020/0017094 A1   Jan. 16, 2020

(30) Foreign Application Priority Data
Sep. 21, 2016   (AT) .............................. A 50844/2016

(51) Int. Cl.
*B60T 17/22*   (2006.01)
*B60T 13/66*   (2006.01)
(Continued)

(52) U.S. Cl.
CPC .......... *B60T 17/228* (2013.01); *B60T 13/665* (2013.01); *B60T 17/221* (2013.01);
(Continued)

(58) Field of Classification Search
CPC .... B60T 17/228; B60T 13/665; B60T 17/221; F16D 65/183; F16D 66/00; F16D 2066/001
See application file for complete search history.

(56) References Cited

U.S. PATENT DOCUMENTS

| | | | |
|---|---|---|---|
| 6,186,601 B1* | 2/2001 | Linden | B60T 8/3275 303/113.1 |
| 2005/0264103 A1* | 12/2005 | Kahrs | B60T 17/228 303/177 |

(Continued)

FOREIGN PATENT DOCUMENTS

| | | |
|---|---|---|
| DE | 3407716 | 9/1985 |
| DE | 4235364 | 4/1994 |

(Continued)

OTHER PUBLICATIONS

PCT International Search Report based on PCT/EP2017/072996 dated Dec. 22, 2017.
(Continued)

*Primary Examiner* — Thomas Ingram
(74) *Attorney, Agent, or Firm* — Cozen O'Connor

(57) ABSTRACT

A method for influencing the kinematic behavior of a vehicle, in particular a rail vehicle with at least one friction brake system, wherein a brake effect is generated by pressing at least one first and second friction elements against each other, where to achieve advantageous method conditions, temperatures of at least the first friction element are calculated from at least speed, brake pressure, external temperature of the vehicle and absolute times, and heat conduction through the first friction element and a speed-dependent cooling process of the first friction element are taken into consideration during the calculation, and where the kinematic behavior of the vehicle is influenced based on the calculation such that expensive fitting of the friction (Continued)

brake system with sensors for measuring friction element temperatures can be advantageously omitted, and the thermal state of the friction brake system can still be estimated with a high degree of precision.

13 Claims, 2 Drawing Sheets

(51) Int. Cl.
  *F16D 65/18* (2006.01)
  *F16D 66/00* (2006.01)
(52) U.S. Cl.
  CPC .......... *F16D 65/183* (2013.01); *F16D 66/00* (2013.01); *F16D 2066/001* (2013.01)

(56) References Cited

U.S. PATENT DOCUMENTS

| 2011/0054758 A1* | 3/2011 | Bae .................. F16D 66/00 701/92 |
| 2011/0139555 A1 | 6/2011 | Hidekazu |
| 2015/0060608 A1* | 3/2015 | Carlson ................. B60T 8/1705 246/122 R |
| 2015/0120163 A1* | 4/2015 | Ohara ..................... F16D 65/18 701/70 |
| 2017/0305577 A1* | 10/2017 | Bill .......................... B60T 17/22 |

FOREIGN PATENT DOCUMENTS

| DE | 4418768 | 12/1995 |
| DE | 19943352 | 4/2001 |
| DE | 102006057065 | 6/2008 |
| EP | 1083360 | 3/2001 |
| EP | 1270358 | 1/2003 |
| EP | 1950111 | 7/2008 |
| WO | WO9200212 | 1/1992 |
| WO | WO 02/064408 | 8/2002 |

OTHER PUBLICATIONS

Office Action dated Sep. 1, 2020 issued in Chinese Patent Application No. 201780058247.0.

* cited by examiner

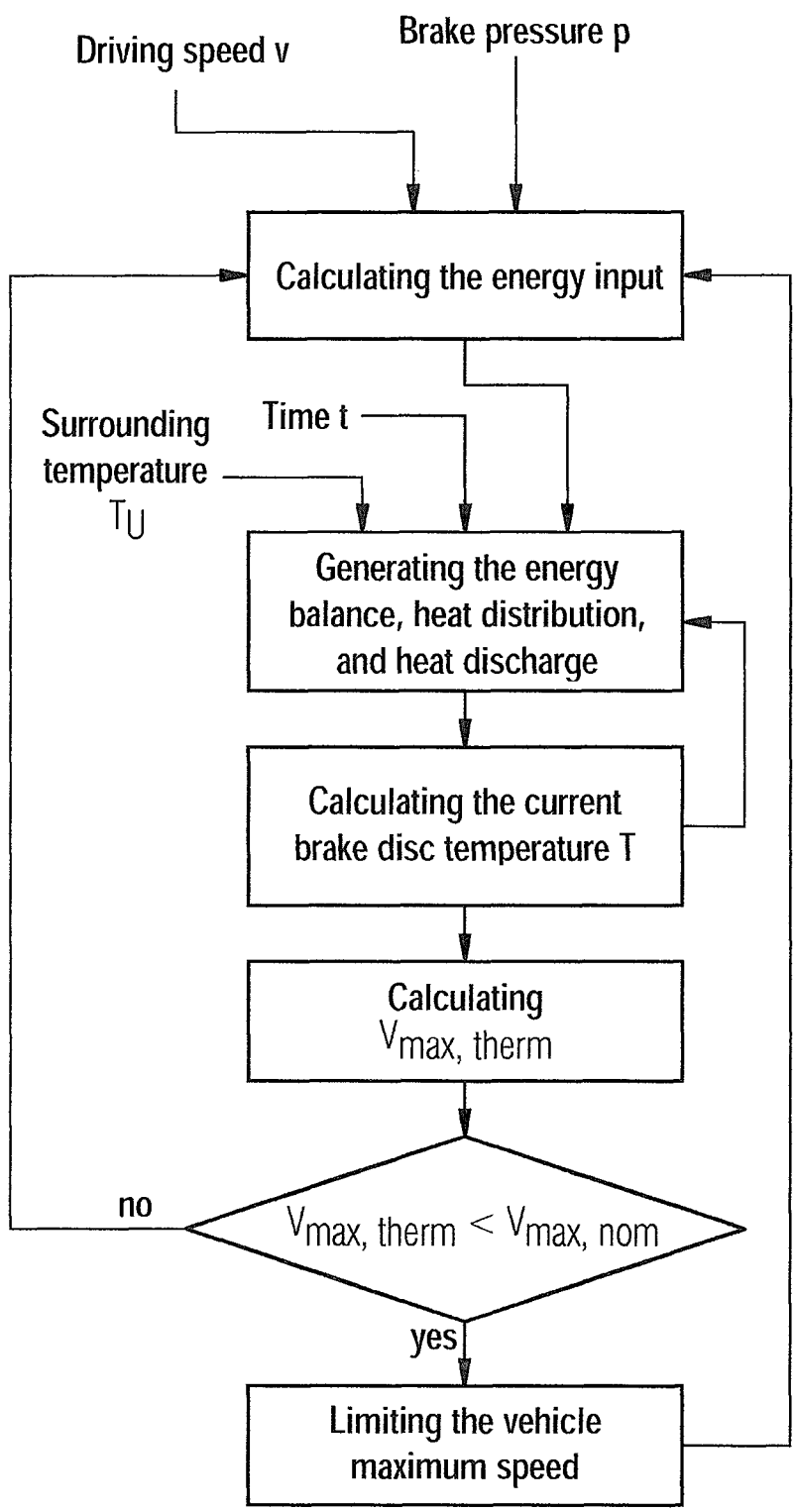

METHOD FOR INFLUENCING THE KINEMATIC BEHAVIOR OF A VEHICLE

CROSS-REFERENCE TO RELATED APPLICATIONS

This is a U.S. national stage of application No. PCT/EP2017/072996 filed Sep. 13, 2017. Priority is claimed on Austria Application No. A50844/2016 filed Sep. 21, 2016, the content of which is incorporated herein by reference in its entirety.

BACKGROUND OF THE INVENTION

1. Field of the Invention

The invention relates to a method for influencing the kinematic behavior of a vehicle, in particular a rail vehicle having at least one friction brake system, where a braking effect is generated by pressing at least a first friction element and a second friction element against each other.

2. Description of the Related Art

Vehicles are often equipped with friction brake systems, where a braking effect on the vehicle is triggered by pressing friction elements against each other, i.e., kinetic energy of the vehicle is converted into heat. Known versions of friction brake systems include, e.g., pneumatic disc brakes. Pneumatic disc brakes comprise, e.g., a brake disc that is mounted on a wheelset, and a brake caliper comprising a brake cylinder, a linkage and brake pads. The brake cylinder has a piston, via which the brake linkage is actuated and the brake pads are pressed against the brake disc. The brake cylinder has compressed air connectors via which compressed air from the compressed air system of the vehicle is applied to the piston to actuate the linkage. The compressed air system includes components such as compressors or brake control devices, for open-loop control and closed-loop control of the disk brake. The conversion of kinetic energy of the vehicle into heat results in a temperature increase of the friction elements, i.e., a temperature increase of, e.g., the brake disc and the brake pads in the case of the disk brake.

The materials used must not lose their required properties with respect to stability or chemical resistance, when the maximum temperatures occur. In particular, brake pads made of organic material have a low temperature resistance, and temperatures above approximately 300° C. can cause smoke to develop. For these reasons, the risk of exceeding specified maximum temperatures of brake components should be avoided.

Various thermal calculation methods are known from the prior art. For example, an analytical method for temperature calculation using a one-dimensional heat conduction equation is described by Saumweber et al., page 22 ff., "Grundlagen der Schienenfahrzeugbremse" ["Fundamental principles of the rail vehicle brake"] of the Archiv für Eisenbahntechnik [Archive for Railway Technology], Hestra-Verlag, 1990.

EP 1 950 111 B1 discloses a method for evaluating the temperature of a brake disc is disclosed, where the temperature is calculated as a function of a thermal energy, a mass and a thermal capacity of the brake disc.

DE 199 43 352 A1 discloses an apparatus and a method for determining the temperature of brake elements provided on a vehicle. The method calculates temperatures of a brake system from the kinetic energy of the vehicle, and defines permitted driving speeds on this basis.

DE 42 35 364 C2 describes a method for capturing the temperature of a disk brake, where a temperature increase of the brake is calculated from a load signal that associates the driving speed with the application force of brake pads onto a brake disc, and a temperature reduction of the brake is calculated from a dissipated heat quantity.

The cited approach in the form disclosed has the disadvantage that the model underlying the method does not allow for any heat conduction through the brake disc and the cooling is not calculated as a function of speed, whereby computed results for the temperature increase and temperature decrease may contain inaccuracies.

Furthermore, the method remains active and calculates temperatures until the brake disc exhibits the surrounding temperature. This means that, if necessary, the computing unit that performs the calculations must remain switched on or supplied with power for a specific time duration, even after a vehicle has been parked.

Moreover, a warning is output as soon as the calculation reveals that a critical temperature of the brake is imminent. There is no prediction of critical temperatures that might occur in the future.

SUMMARY OF THE INVENTION

In view of the foregoing, it is therefore an object of the invention to provide an improved method relative to the prior art.

This and other objects and advantages are achieved in accordance with the invention by a method in which at least temperatures of at least a first friction element are calculated from at least information relating to a speed, a brake pressure and an external temperature of the vehicle and to absolute times, where heat conduction through the at least first friction element and a speed-dependent cooling of the at least first friction element are taken into consideration during this calculation, and in which the kinematic behavior of the vehicle is influenced based on this calculation.

This firstly has the advantage that it is unnecessary to fit the friction brake system with sensors for measuring friction element temperatures, where the fitting is structurally complex, subject to maintenance, and expensive, because temperatures and further parameters (e.g., permitted driving speeds based on the thermal state, or parameters of the cooling) of the friction brake system are determined arithmetically on a corresponding computing unit.

A high degree of precision in relation to the calculated thermal behavior of the friction brake system is also achieved as a result of taking the heat conduction through the first friction element and the speed-dependent cooling of the first friction element into consideration.

Moreover, the capture of an absolute time signal has the advantage that, following a time period in which the vehicle was parked, a cooling function is used to determine temperatures that the friction brake system exhibited during this parking time period and which are used as starting values for the temperature calculations following a restart of the vehicle. For this reason, the computing unit can be turned off at the point in time at which the vehicle is parked.

The kinematic behavior of the vehicle is influenced based on the results of the temperature calculation. Here, it is possible to define not only a permitted maximum speed but also, e.g., a driving profile, whereby beneficial flexibility is provided in relation to application-specific requirements. In particular, taking into consideration the thermal working capacity of the friction brake system, it is thereby possible to optimize the driving characteristic with reference to a journey duration, and/or the driving speed.

By virtue of the method, operation of the vehicle is prevented in temperature ranges that are not permitted with regard to the thermal load on the friction brake system. The friction brake system can be configured correspondingly, such that overdimensioning of components is prevented and/or required protections are reduced.

In an advantageous embodiment, the calculation is performed taking into consideration heat conduction through the second friction element and a speed-dependent cooling of the second friction element. As a result of this measure, a further increase is achieved in the precision of the arithmetic capture of thermal states of the friction brake system.

It is beneficial to predict temperatures of at least the first friction element for future braking operations of the vehicle. This measure allows thermal overloads of the friction brake system to be prevented before they occur by influencing the kinematic behavior of the vehicle.

In an advantageous embodiment, the kinematic behavior of the vehicle is influenced automatically. This measure makes it possible to achieve a reduction in the workload of a vehicle driver. Furthermore, the risk of an insufficient response of the vehicle to the specification of a required kinematic behavior is reduced.

It is beneficial for calculation results be presented to operators of the vehicle at least such that a warning is output before any braking operation for which it is predicted that a critical temperature will be reached with respect to the thermomechanical load at least of the first friction element.

This measure allows the driving characteristic to be planned in a beneficial manner. For example, already before an acceleration phase of the vehicle, a vehicle driver can specify a maximum permitted driving speed from which braking is possible without exceeding the critical temperature of the friction brake system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below with reference to exemplary embodiments, in which:

FIG. 3 shows a flow diagram of an exemplary embodiment of a method in accordance with the invention for cyclically calculating temperatures and permitted driving speeds, and for limiting the driving speed.

DETAILED DESCRIPTION OF THE EXEMPLARY EMBODIMENTS

Figure 1:
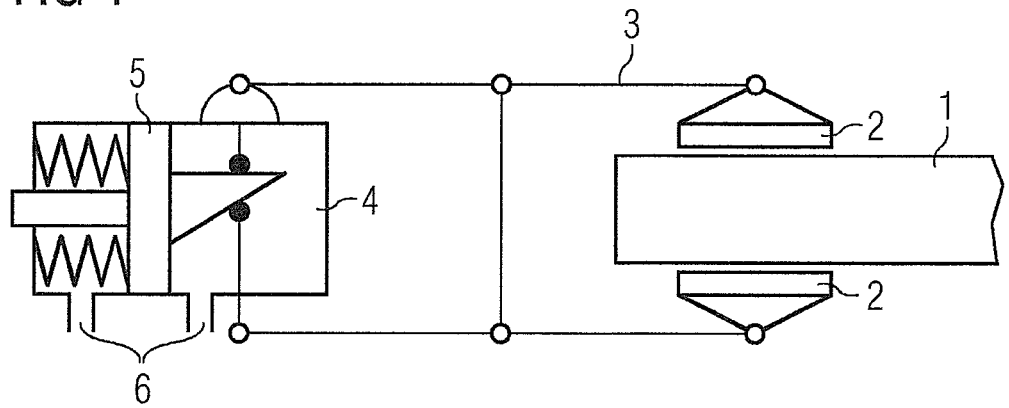
FIG. 1 shows a schematic illustration of an exemplary embodiment of a pneumatic friction brake with a brake disc and a brake caliper in accordance with the invention.

In FIG. 1, a schematically illustrated section of a friction brake system of a rail vehicle shows a pneumatic disk brake. This comprises a first friction element 1, formed as a brake disc that is mounted on a wheelset shaft (not shown) of the rail vehicle, and a brake caliper. The brake caliper has a second friction element 2 comprising two brake pads. The brake caliper further comprises a brake cylinder 4 with the compressed air connectors 6, a piston 5 and a linkage 3.

The piston 5 actuates the linkage 3, whereby the brake pads, i.e., the second friction element 2, arranged on the linkage 3 are pressed against the brake disc, i.e., the first friction element 1. Compressed air from a compressed air system (not shown) of the rail vehicle is applied to the piston 5 via the compressed air connectors 6 to actuate the linkage 3.

Figure 2:
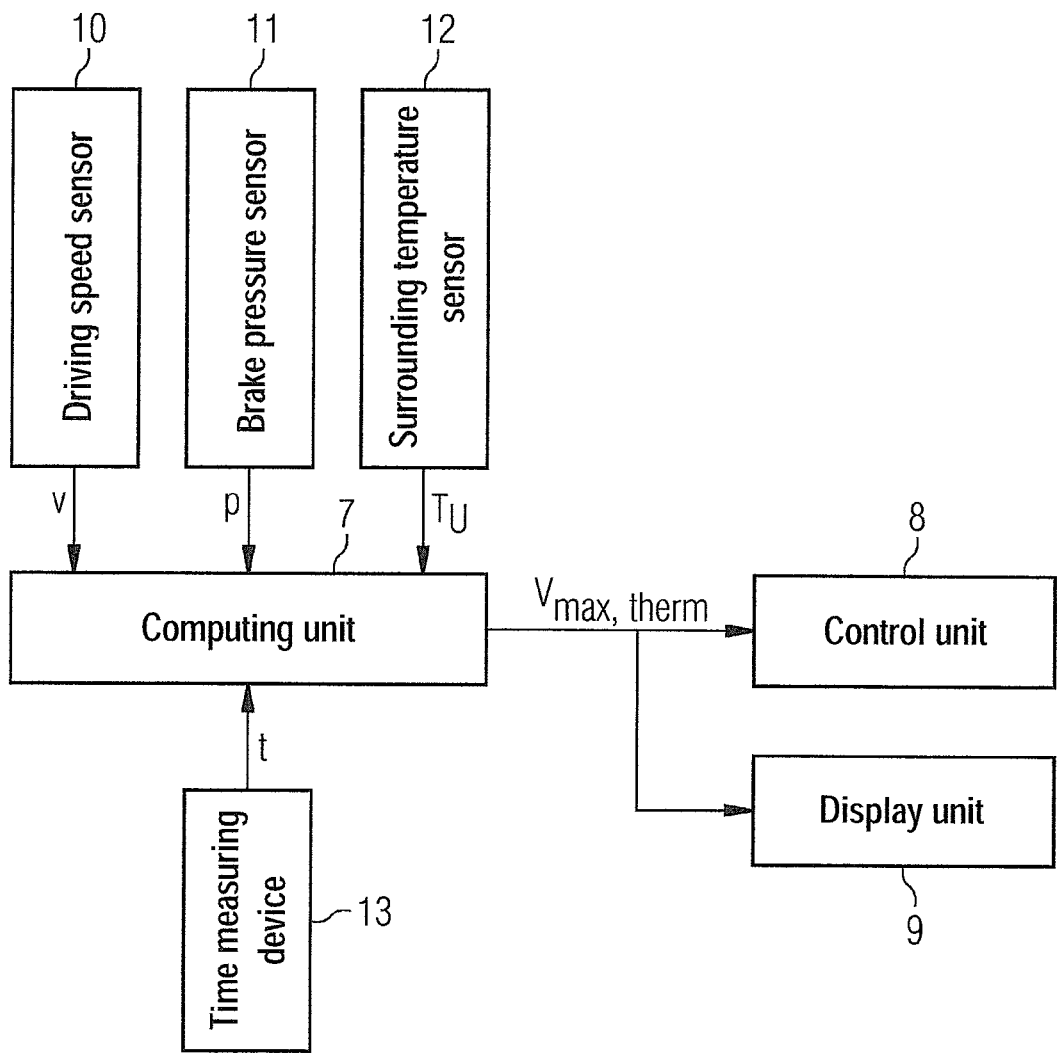
FIG. 2 shows a function diagram of an exemplary embodiment of an apparatus in accordance with the invention for a method in accordance with the invention, comprising devices for data recording, a computing unit and a control unit.

The compressed air system has components for open-loop control and closed-loop control of the friction brake system, such as compressors, or brake control devices. The brake control device has a computing unit 7 that is illustrated in FIG. 2 and in which thermal calculations are performed in accordance with the inventive method. The brake control device is connected to a vehicle control system (not shown). The vehicle control system comprises a control unit 8 as illustrated in FIG. 2, by which the kinematic behavior of the rail vehicle is influenced based on results of the thermal calculations.

A braking effect on the rail vehicle is produced by pressing the first friction element 1 and the second friction element 2 against each other. In this way, a conversion of kinetic energy of the rail vehicle into heat occurs, thereby causing a temperature increase of the first friction element 1 and the second friction element 2.

A reduction or cancellation of the braking effect on the rail vehicle is produced by releasing the first friction element 1 and the second friction element 2 from each other. With this and due to the effect of known heat transfer principles, the temperatures in the first friction element 1 and in the second friction element 2 are reduced, i.e., the first friction element 1 and the second friction element 2 cool down. The thermal behavior described in the foregoing is calculated via the inventive method.

FIG. 2 shows a function diagram of an exemplary embodiment of an inventive apparatus, which is configured for the inventive method for influencing the kinematic behavior of a rail vehicle. The apparatus comprises a driving speed sensor 10 for capturing a driving speed v, a brake pressure sensor 11 for capturing a brake pressure p, a surrounding temperature sensor 12 for capturing a surrounding temperature $T_U$, a time measuring device 13 for capturing an absolute time t, and a display unit 9, these being connected via corresponding data lines to a computing unit 7. The driving speed sensor 10, the brake pressure sensor 11 and the surrounding temperature sensor 12 are arranged in a chassis (not shown) of the rail vehicle. A beneficial solution is produced in this way.

In accordance with the invention, it is however also feasible for the driving speed v and the brake pressure p to be read into the computing unit 7 from a data bus system (e.g., Multi Vehicle Bus (MVB)) of the rail vehicle.

Furthermore, it is also conceivable for the brake pressure p to be determined approximately from a deceleration and a mass that is to be braked. Here, the deceleration is calculated, e.g., by differentiation of the driving speed v, and the mass to be braked is determined via a load braking apparatus.

It is moreover also feasible to capture an angular speed of a wheel or a wheel speed instead of a driving speed v, and to perform the thermal calculations using this angular speed or wheel speed.

The time measuring device 13 and the computing unit 7, implemented in a brake control device (not shown), are arranged in a car body (not shown).

Via corresponding data lines, the computing unit 7 receives data relating to the driving speed v from the driving speed sensor 10, data relating to the brake pressure p from the brake pressure sensor 11, data relating to the surrounding temperature $T_U$ from the surrounding temperature sensor 12, and data relating to the absolute time t from the time measuring device 13, and executes computational operations in accordance with the inventive method. Using the driving speed v, the brake pressure p, the surrounding temperature $T_U$ and the absolute time t, thermal states of the friction brake system illustrated in FIG. 1 are determined in accordance with the description for FIG. 3, and a permitted driving speed $v_{max,therm}$ is determined based on the thermal states.

The computing unit 7 is connected via corresponding data lines to a control unit 8 that is arranged in the car body and is implemented in a vehicle control system (not shown). The control unit 8 influences the kinematic behavior of the rail vehicle such that, e.g., the rail vehicle is automatically braked to a permitted driving speed $v_{max,therm}$, this being determined by the computing unit 7 based on a thermal calculation and transferred to the control unit 8, or an acceleration beyond this permitted driving speed $v_{max,therm}$ is prevented.

The display unit 9 is arranged in a driver's cab (not shown) of the rail vehicle. It is used to display permitted driving speeds $v_{max,therm}$ to a train driver, where the speeds are based on thermal calculations as per the inventive method. Data required for presentation is transmitted from the computing unit 7 to the display unit 9 via corresponding data lines.

In accordance with the invention, it is also possible to display permitted decelerations or permitted driving profiles (time-relative sequences of acceleration and deceleration sections and phases with constant driving speed v or stoppage phases).

In order to warn against unfavorable kinematic behavior of the rail vehicle with respect to thermal states of the friction brake system, acoustic signals are also output to the driver via an audio output unit of the display unit 9.

In accordance with the invention, various embodiments and arrangements of the driving speed sensor 10, the brake pressure sensor 11, the surrounding temperature sensor 12, the time measuring device 13, the display unit 9, the computing unit 7 and the control unit 8 are conceivable. For example, it is feasible to arrange the computing unit 7 separately from the brake control device and the control unit 8 separately from the vehicle control system.

Furthermore, it is also conceivable, e.g., for the computing unit 7 to be arranged in an operator console and communicate with the rail vehicle via radio signals, i.e., to receive information relating to the driving speed v of the rail vehicle and, based on a thermal calculation that has been performed in accordance with the invention, to send instructions for the purpose of limiting the driving speed v to a permitted driving speed $V_{max,therm}$.

A flow diagram illustrated in FIG. 3 describes steps of an exemplary embodiment of an inventive method for the purpose of thermal calculation and influencing the kinematic behavior of a rail vehicle, where the steps are performed in a computing unit 7 as shown in FIG. 2 and in a control unit 8 of the rail vehicle.

In order to perform the method, data relating to a driving speed v, a brake pressure p, a surrounding temperature $T_U$ and an absolute time t is transferred to the computing unit 7 as per the description for FIG. 2 at a frequency of 4 Hz, other frequencies also being conceivable in accordance with disclosed embodiments of the invention.

The transferred data is checked with respect to its plausibility. If one or more values are invalid, the kinematic behavior of the rail vehicle is initially no longer influenced. If these values are declared to be valid again and if no braking by a first friction element 1 as per FIG. 1 is performed for longer than a specified time duration during a journey of the rail vehicle, then temperatures $T_S$ of the first friction element 1 are calculated again based on a restart of the thermal calculation using a starting temperature (e.g., the current surrounding temperature $T_U$ at the point in time of the restart), and the kinematic behavior of the rail vehicle is influenced again if applicable. On the basis of the driving speed v and the brake pressure p, an energy input into a first friction element 1 (a brake disc) as per FIG. 1 is calculated, i.e., the energy that is introduced into the first friction element 1 as a result of braking.

Based on this energy, the surrounding temperature $T_U$ and the absolute time t, an energy balance is produced, a heat distribution between the first friction element 1 and the second friction element 2 and within the first friction element 1 is calculated, and a heat discharge into the surroundings of the rail vehicle is determined.

The heat conduction through the first friction element 1 and the speed-dependent cooling thereof are taken into consideration. In accordance with the disclosed embodiments of the invention, in order to further improve the precision of the thermal calculation, it is also possible for the heat conduction through a second friction element 2 (brake pads) as per FIG. 1 and the speed-dependent cooling thereof to be taken into consideration.

When determining the energy balance, the heat distributions and the heat discharge, use is made of conventional methods from the prior art.

A temperature $T_S$ of the first friction element 1 (the brake disc temperature) is determined cyclically at a frequency of 4 Hz, where other frequencies are also conceivable in accordance with disclosed embodiments of the invention, from the heat distribution and the heat discharge, taking into consideration stored temperatures $T_{S,n-1}$ of the first friction element 1 from previous time steps of the calculation and the surrounding temperature $T_U$.

In accordance with the embodiments of the invention, it is also possible to calculate temperatures $T_B$ of the second friction element 2.

The calculated temperature $T_S$ of the first friction element 1 and a temperature prediction for future braking operations of the rail vehicle with predefined parameters (e.g., with a predefined deceleration) are used to calculate that permitted driving speed $v_{max,therm}$ from which a similarly predefined braking operation is still possible without exceeding a critical temperature $T_{S,krit}$ that has been specified for the first friction element 1. A lower limit value is defined for $v_{max,therm}$ to avoid operationally unrealistic driving speed specifications or driving speed specifications of less than or equal to 0 m/s for the rail vehicle. This lower limit value is set such that the critical temperature $T_{S,krit}$ of the first friction element 1 is not exceeded when performing predefined braking operations, subsequent acceleration to this lower limit value and braking again, i.e., as a result of following this operating cycle, a temperature $T_S$ of the first friction element 1 is established that, on average, no longer changes.

If the permitted driving speed $v_{max,therm}$ is less than a nominal maximum speed $v_{max,nom}$ of the rail vehicle, the permitted driving speed $v_{max,therm}$ is transmitted from the computing unit 7 to the control unit 8 to limit the driving speed v of the rail vehicle to the permitted driving speed $v_{max,therm}$. Compliance with this permitted driving speed $v_{max,therm}$ is monitored by the control unit 8, where excessive speed is prevented or, if the permitted driving speed $v_{max,therm}$ is exceeded, then the rail vehicle is automatically braked to the speed. The permitted speed $v_{max,therm}$ is displayed on a display unit 9 in a driver's cab as per the description for FIG. 2, and a visual and acoustic warning signal is output before the speed is exceeded.

In accordance with the embodiments of the invention, it is also conceivable that the driving speed v is not influenced automatically, but instead an instruction to comply with the permitted driving speed $v_{max,therm}$ is simply output on the display unit 9 and is implemented by manual intervention of a train driver.

The calculation of the permitted driving speed $v_{max,therm}$ and, if applicable the required limitation of the driving speed v, occurs cyclically at a frequency of 4 Hz, other frequencies also being conceivable in accordance with the embodiments of the invention.

In accordance with the embodiments of the invention, it is also possible for a permitted deceleration to be calculated and compliance therewith monitored by the control unit 8. Combinations are also feasible, i.e., the calculation and monitoring of a permitted deceleration and a compatible permitted driving speed $v_{max,therm}$, for example.

Furthermore, it is also feasible to calculate and monitor a permitted driving profile (time-relative sequences of acceleration and deceleration sections and phases with constant driving speed v or stoppage phases).

If the rail vehicle was parked for a time period, following its restart, then a temperature $T_S$ is determined using the method described above and the cited parameters, in particular the absolute time t and a stored temperature $T_{S,n-1}$ of the first friction element 1, the temperature having been stored at the time point of parking, a stored absolute time $t_{n-1}$, etc., where the temperature $T_S$ is that of the first friction element 1 at the end of this parking time period or at the time point of the restart. As part of this activity, the cooling of the first friction element 1 is calculated using a cooling function following stoppage of the rail vehicle, where the function is predefined in accordance with methods disclosed in the prior art, a stored surrounding temperature $T_{U,n-1}$ at the time point of parking, and the surrounding temperature $T_U$ at the time point of the restart of the rail vehicle. The calculated temperature $T_S$ of the first friction element 1 is used as a starting value for thermal calculations following the restart of the rail vehicle.

The computing unit 7 can therefore be turned off concurrently with the rail vehicle and need not be supplied with power separately. The computing unit 7 has a power supply unit. Consequently, it is nonetheless conceivable to perform temperature calculations even during a parking time period of the rail vehicle.

In accordance with the disclosed embodiments of the invention, it is also conceivable for a cooling function to take the cooling of the second friction element 2 into consideration and to perform temperature calculations with respect to the second friction element 2.

If no deceleration braking of the rail vehicle takes place for a defined time period or if the parking time (time during which the computing unit 7 is turned off) continues for longer than a defined time period, the temperature calculation is reinitialized. The current surrounding temperature $T_U$ at the time point of the reinitialization is used as a starting temperature.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for influencing kinematic behavior of a vehicle having at least one friction brake system, wherein a braking effect being generated by pressing at least a first friction element and a second friction element against each other, the method comprising:
    calculating at least temperatures of at least the first friction element from information relating to at least a speed, a brake pressure, a surrounding external temperature of the vehicle and absolute time signal values, a heat conduction through the at least first friction element and a speed-dependent cooling of the at least first friction element being taken into consideration during said calculation; and
    operating the vehicle based on the calculation to influence the kinematic behavior of the vehicle.

2. The method as claimed in claim 1, wherein heat conduction through the second friction element and speed-dependent cooling of the second friction element are taken into consideration when performing the calculation.

3. The method as claimed in claim 2, further comprising:
    predicting temperatures of at least the first friction element for future braking operations of the vehicle.

4. The method as claimed in claim 1, further comprising:
    predicting temperatures of at least the first friction element for future braking operations of the vehicle.

5. The method as claimed in claim 1, further comprising:
    calculating, subsequent to a time during when the vehicle is parked, at least temperatures exhibited by at least the first friction element during said time the vehicle is parked.

6. The method as claimed in claim 1, wherein the kinematic behavior of the vehicle is influenced with respect to a calculated permitted driving speed of the vehicle.

7. The method as claimed in claim 1, wherein the kinematic behavior of the vehicle in influenced with respect to a calculated permitted deceleration rate of the vehicle.

8. The method as claimed in claim 1, wherein the kinematic behavior of the vehicle is influenced with respect to a calculated permitted driving profile of the vehicle.

9. The method as claimed in claim 1, wherein the kinematic behavior of the vehicle is influenced automatically.

10. The method as claimed in claim 1, further comprising: presenting calculation results to operators of the vehicle such that a warning is at least output before any braking operation for which it is predicted that a critical temperature will be reached with respect to a thermomechanical load of at least the first friction element.

11. The method as claimed in claim 1, wherein the vehicle is a rail vehicle.

12. An apparatus for implementing a method for influencing kinematic behavior of a vehicle having at least one friction brake system, the apparatus comprising:
   a computer;
   a controller connected to the computer;
   a driving sensor connected to the computer and connected to the vehicle to determine a driving speed;
   a brake pressure sensor connected to the computer to capture a brake pressure;
   a temperature sensor connected to the computer to capture a surrounding external temperature of the vehicle;
   a time measurer connected to the computer to capture absolute time values; and
   data transferrors connected to the vehicle;
   wherein the apparatus is configured to:
      calculate at least temperatures of at least a first friction element from information relating to at least the driving speed, the brake pressure, the surrounding external temperature of the vehicle and the absolute time values, a heat conduction through the at least first friction element and a speed-dependent cooling of the at least first friction element being taken into consideration during said calculation; and
   wherein the vehicle is operated based on the calculation by the apparatus to influence the kinematic behavior of the vehicle.

13. The apparatus as claimed in claim 12, further comprising:
   a display connected to the computer and the vehicle, said display presenting calculation results.

* * * * *